US012732364B1

(12) United States Patent
Stoller

(10) Patent No.: US 12,732,364 B1
(45) Date of Patent: Sep. 8, 2026

(54) SYSTEM AND METHOD FOR CONFIRMATION OF LIFE STATUS AND RELATED FILE STORAGE AND RELEASE PROTOCOL

(71) Applicant: Jeffrey M Stoller, Miami, FL (US)

(72) Inventor: Jeffrey M Stoller, Miami, FL (US)

( * ) Notice: Subject to any disclaimer, the term of this patent is extended or adjusted under 35 U.S.C. 154(b) by 4 days.

(21) Appl. No.: 18/935,607

(22) Filed: Nov. 3, 2024

Related U.S. Application Data

(60) Provisional application No. 63/547,377, filed on Nov. 5, 2023.

(51) Int. Cl.

| | |
|---|---|
| ***H04L 9/30*** | (2006.01) |
| ***G06F 21/62*** | (2013.01) |
| ***G08B 21/04*** | (2006.01) |
| ***H04L 9/08*** | (2006.01) |

(52) U.S. Cl.
CPC .......... *H04L 9/302* (2013.01); *G06F 21/6245* (2013.01); *G08B 21/0415* (2013.01); *H04L 9/088* (2013.01); *G06F 21/6218* (2013.01)

(58) Field of Classification Search
CPC . G06F 21/6245; G06F 21/6209; H04L 9/302; H04L 9/088; G08B 5/00; G08B 21/0415
See application file for complete search history.

(56) References Cited

U.S. PATENT DOCUMENTS 7,911,334 B2 * 3/2011 Busey ................ G08B 21/0415 455/412.2
10,769,288 B2 * 9/2020 Garcia .................... G06F 21/60
2018/0041338 A1 * 2/2018 Nighswander ........ H04L 9/0825
2021/0335462 A1 * 10/2021 Yantus ............... G06F 21/6218

* cited by examiner

*Primary Examiner* — Lynn D Feild
*Assistant Examiner* — Kelah Janae Mcfarland-Barnes
(74) *Attorney, Agent, or Firm* — Wei Wu

(57) ABSTRACT

A server system for managing life status verification is disclosed. The system includes a processor and associated memory configured to issue periodic, customizable notifications to a user through one or more connected user devices, where the notifications are based on user-defined time intervals. The processor receives acknowledgments from the user in response to these notifications, constituting life status confirmations indicating the user's current well-being. The server communicates with one or more designated individual devices associated with individuals specified by the user, based on predefined conditions set by the user. If no life status confirmation is received within a user-defined response period, the server sends alerts to designated individual devices. Additionally, the system securely stores user data in memory, organized into multiple data folders categorized by access level. Each folder is configurable by the user to control access rights of designated individuals under specific, predefined conditions.

20 Claims, 5 Drawing Sheets

SYSTEM AND METHOD FOR CONFIRMATION OF LIFE STATUS AND RELATED FILE STORAGE AND RELEASE PROTOCOL

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A significant portion of the population lives alone, including elderly individuals, individuals with health conditions, and others who may not have regular daily interactions with family members or caregivers. This isolation can present serious risks, especially in cases where the individual becomes incapacitated, experiences a medical emergency, or passes away unexpectedly. While there are products on the market, such as medical alert systems and fall detectors, that can notify others in the event of an acute incident (e.g., a fall, stroke, or other medical emergency), these systems rely on the individual actively triggering an alert or the occurrence of a specific event.

However, there remains a critical gap in ensuring that individuals who are unable to trigger such devices, or who gradually become incapacitated over time, are monitored in a way that ensures their wellbeing is regularly checked. For instance, in cases where a person has not been heard from or interacted with others for a significant period of time, there may be no immediate way for loved ones, caregivers, or legal representatives to be notified.

Moreover, in situations where an individual has passed away or is incapacitated, the timely release of important personal documents—such as wills, health directives, insurance details, and other sensitive files—becomes essential for their loved ones or legal designees. Traditional methods of managing such information are often manual, requiring significant time and effort to organize and retrieve, and are vulnerable to issues of privacy and security. Furthermore, many systems lack a comprehensive, automated approach to managing both life status verification and secure file distribution, leaving critical gaps in communication and access to essential data during emergencies.

Therefore, there is a pressing need for a system that not only provides secure, automated notification to designated persons in the event that the individual cannot confirm their status, but also facilitates the release of important documents and personal information, all while maintaining strict privacy standards and utilizing robust data security measures to protect the individual's sensitive data.

DESCRIPTION

The present disclosure provides a system 100 for addressing the aforementioned problems by managing the life status of a user. This is accomplished by performing periodic checks, which can occur at intervals such as daily, or at user-defined frequencies.

The system 100 can be designed to ensure that the user's well-being is regularly monitored, markedly for individuals who live alone or may not have frequent interactions with others. To achieve this, the user can designate multiple designees such as family members, friends, attorneys, healthcare professionals, neighbors, or any trusted individuals. These designees are authorized to receive notifications and updates about the user's life status, ensuring a network of contacts is available for the user in times of need. In an example embodiment, the designees are notified only if the user does not respond, and may not receive updates about the user's life status.

Figure 1:
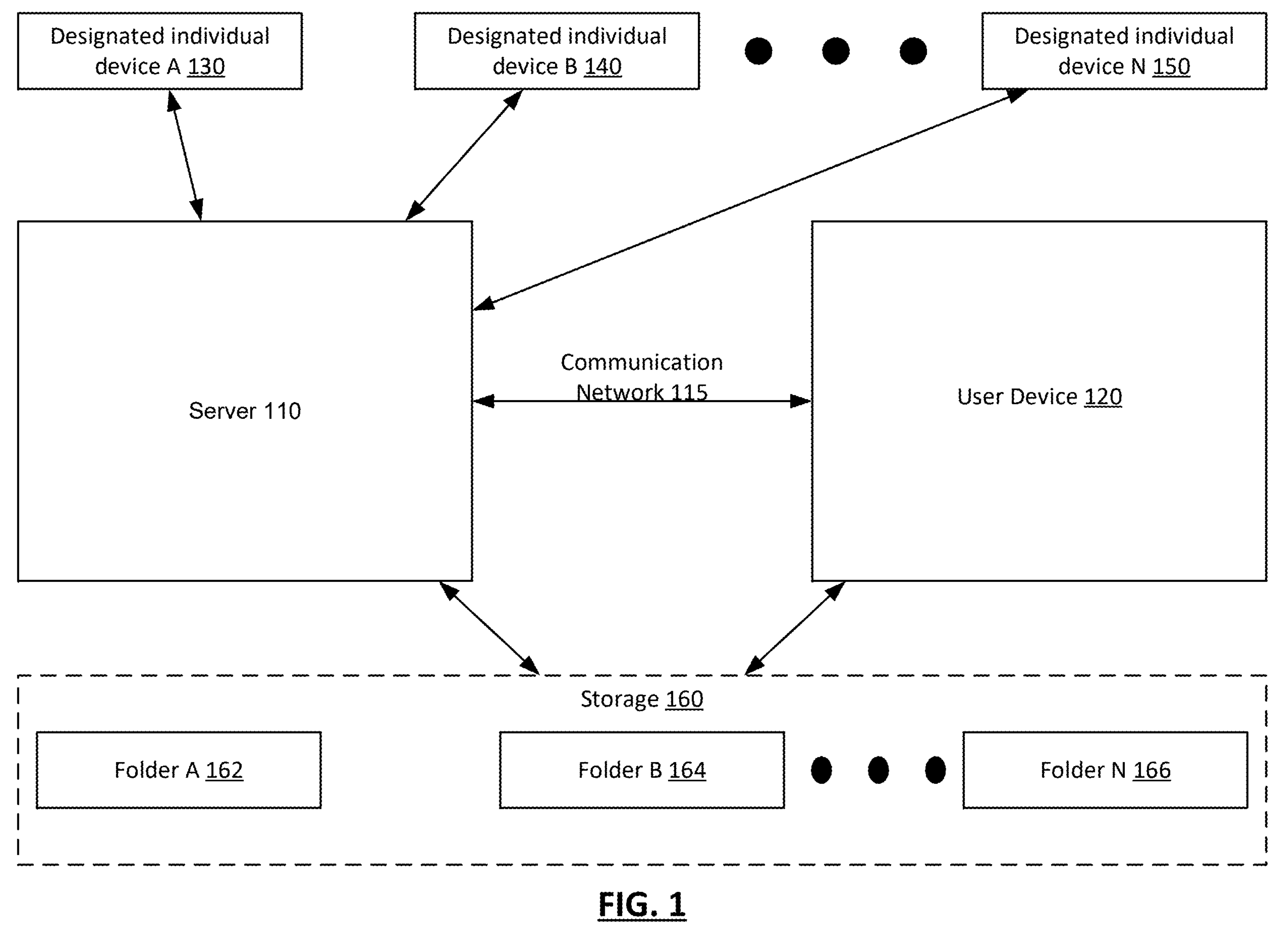
FIG. 1 shows a system diagram according to an example embodiment of the present disclosure.

As shown in FIG. 1, the system 100 includes a server 110 that facilitates wellness checks or confirmations from a user via a user device 120. The server 110 can be tailored to send notifications through various communication channels, such as text messages, emails, or app notifications, requesting the user to confirm their well-being. The user device 120 can include a range of hardware devices, such as mobile devices, tablets, hand-held or laptop devices, smart phones, personal digital assistants, desktop computers, wearable devices, augmented reality glasses, virtual reality headsets, or any similar device capable of supporting communication protocols.

The users interact with the server 110 through the user device 120 through a communication network 115. This network 115 can include, but is not limited to, the Internet, cellular networks, local area networks (LAN), or any other suitable communication infrastructure. This interaction over the communication network 115 can include, but is not limited to, sending and receiving notifications, uploading or managing data, and confirming life status checks. While FIG. 1 shows a single user device 120, a person of skill in the art would understand that multiple user devices are capable of communicating simultaneously with the server 110 through the communication network 115.

In an example embodiment, the user can set customizable notification intervals for text messages, referred to as 'pings,' that initiate life status checks. The system enables user-defined schedules, with optional escalation protocols that activate based on user-determined response windows, providing flexibility to align with user needs and preferences. These pings are critical for ensuring that the user's well-being is regularly confirmed, especially for individuals who live alone or are in situations where regular monitoring is necessary or beneficial. The system provides flexibility by enabling the user to set the ping frequency to suit their preferences and lifestyle. For instance, the user may opt to receive daily pings, pings every few days, or pings on a weekly basis, depending on their level of activity and need for monitoring.

When a ping is issued by the server 110, it is sent to the user's device 120 such as a mobile phone via a dedicated app, text messages, email notifications or other known notification systems may also be used. In an example embodiment, the ping itself can be a simple message or notification asking the user to confirm that they are well.

This can be done with minimal effort on the part of the user—such as tapping a button or responding to the message—ensuring that the system is user-friendly and does not impose a burden on the individual. Once the user acknowledges the ping, the system is automatically reset, recording that the user has confirmed their well-being for that time period.

If the user does not respond within a pre-defined period, the server 110 issues notifications to the user at intervals customizable by the user, who may select timeframes ranging from daily to weekly. In the event of a non-response, the system initiates an escalation protocol that includes sending additional alerts to the user device, then escalating the notification to designated individuals' devices based on pre-established response periods. For example, the server 110 automatically pings the devices 130, 140, 150 associated with the various designated individuals to inform them that a response from the user has not been received. The designated individuals' devices (e.g., 130, 140, 150) can include a range of hardware devices, such as smartphones, tablets, laptops, desktop computers, or any other computing device capable of supporting communication protocols. While in FIG. 1, only three designated individuals devices 130, 140, 150 are shown, a person of skill in the art will understand that this is a mere example, and there can be one or more of such individuals' devices.

In response to the pings described above, the system 100 empowers the designated individuals to report the user's condition, should they become aware of it independently. For instance, designated individuals can notify the system if the user has passed away, has received or is receiving medical attention requiring access to the user's medical records, or is well but unavailable to respond personally to their ping. This feature ensures that the system 100 remains flexible and adaptable, catering to a range of possible scenarios in which a user's status may need to be updated.

Alternatively, if the designated individuals are unable to reach the user and suspect that something may be wrong, they may escalate the situation outside of by contacting emergency services or initiating a wellness check.

Additionally, in situations where the user is incapacitated or has passed away, the system 100 allows designated individuals to access the user's securely stored data, in accordance with the preferences the user has set in advance. These preferences could include granting access to specific documents, such as medical records, legal wills, or insurance information, which may be crucial for handling the user's affairs in case of an emergency or death.

The system 100 can include a secure data storage 160. This storage 160 can be divided into multiple designated folders (e.g. folder A 162, folder B 164, folder C 166). While in FIG. 1, only three designated individuals devices 162, 164, 166 are shown, a person of skill in the art will understand that this is a mere example, and there can be one or more such folders. In various example embodiments, the storage 160 can be based in a memory external to the server 110 (as shown in FIG. 1), or it can be based within the server 110 (not shown).

The user has full control over which designated individuals can access particular folders, making the system 100 ideal for securely managing a wide array of personal documents. These folders may store data of various types, including personal documents such as photos, audio files, video files, written messages, and more. Additionally, sensitive health information—such as medical reports, insurance documentation, or legal documents such as wills and banking information—can be securely stored within the system. This allows for a comprehensive digital archive of important information that can be accessed only by authorized individuals when necessary.

In an example embodiment, where the user experiences a medical emergency or passes away and does not respond to their ping, the designated individuals can cause the system 100 to grant the specified designees access to designated folders (e.g. folder A 162, folder B 164, folder C 166). This ensures that essential documents—such as healthcare directives, insurance policies, or legal wills—are available to the appropriate parties in a timely manner.

In an example embodiment, there can be two levels of access—at the first level, medical records/insurance are available if a designee indicates the user is having a medical emergency that requires medical records or is potentially life-threatening. At the second level, only if the designee reports a death, is a verification prompted before granting access to other than medical records/insurance. In the event of the user's death, an employee managing the system 100 verifies the death certificate before granting designees access to the user's data. This ensures that no unauthorized access is granted prematurely and that the user's wishes are respected.

Additionally, in situations where the user is incapacitated or has passed away, the system 100 allows designated individuals to access the user's securely stored data, in accordance with the preferences the user has set in advance. These preferences could include granting access to specific documents, such as medical records, legal wills, or insurance information, which may be crucial for handling the user's affairs in case of an emergency or death. The system 100 ensures that only authorized designated individuals are granted access, and that the access is limited to the specific folders or files the user has designated for such situations.

In an example embodiment, the system 100 may implement a robust data security framework to ensure that all information in the storage 160 is protected in compliance with stringent data privacy regulations, including the Health Insurance Portability and Accountability Act (HIPAA), which governs the handling of sensitive health information.

In an example embodiment, to protect sensitive user data. the system 100 employs Advanced Encryption Standard (AES) for data stored on memory and Rivest-Shamir-Adleman (RSA) encryption for data in transit. Specifically, the server encrypts user data within categorized data folders using AES-256, ensuring unauthorized access is prevented. For data transfer between the server and designated individual devices, RSA encryption utilizes a public-private key pair system, where the server generates a unique public key to encrypt outbound notifications and data. Only designated individual devices with the corresponding private key can decrypt and access this data, ensuring privacy and security across all interactions.

The data stored in the storage 160 can range from personal documents, medical records, and legal wills, to financial details such as banking information. By using AES, the system 100 ensures that even if unauthorized individuals gain access to the system 100 or intercept the stored data, they will not be able to read or use it without the proper decryption credentials.

In an example embodiment, the system 100 may incorporate Rivest-Shamir-Adleman encryption (RSA) encryption, which offers an additional layer of security through its asymmetric cryptography model. Unlike symmetric encryption algorithms, which use a single key for both encryption and decryption, RSA utilizes two distinct but mathematically linked keys: a public key and a private key. These keys work in tandem to ensure secure communication and data transfer. In RSA cryptography, the public key is shared openly and can be used by anyone to encrypt a message. However, only the associated private key—which is kept secure by the recipient—can decrypt the message. This is particularly useful in situations where sensitive information, such as medical data or personal documents, must be securely transmitted between parties. For example, when the system 100 server sends an encrypted file to a designated individual, the public key is used to encrypt the data, and only the designated individual, who possesses the matching private key, can decrypt and access the information.

Similarly, in the reverse process, the private key can be used to encrypt a message, which can then only be decrypted using the corresponding public key. This mechanism ensures the authenticity and confidentiality of the data exchanged within the system. RSA encryption is particularly suited for verifying the authenticity of communications and securing sensitive information during transmission between the system 100 components—such as between the server 110 and user device 120 or between the server 100 and the designated individual devices (e.g., 130, 140, 150). This allows for secure communication while ensuring that data transmitted or retrieved is protected from unauthorized access.

By employing both AES for data storage and RSA for data transmission, the present disclosure achieves a high level of security, ensuring that sensitive user information is protected from unauthorized access both in storage and during transmission. This layered encryption methodology is critical to maintaining the integrity and confidentiality of the user's data, thereby upholding both legal and ethical standards, such as those set by HIPAA.

This dual-layer encryption approach ensures that the system 100 meets the highest standards of data security, safeguarding sensitive information from unauthorized access, tampering, or interception. Even in the unlikely event of a data breach or interception during transmission, the encrypted data would remain unintelligible without the proper decryption key, ensuring that it is useless to any unauthorized party.

In an example embodiment, the server 110 facilitates the interaction between the user device 120 and the designated individual devices (e.g., 130, 140, 150) via a graphical user interface (GUI). This user interface allows the user and the designated individuals to engage with the system's features, such as confirming life status, receiving alerts, managing data access, or uploading documents to secure storage. The user interface can be accessed through a standard web browser or a specialized software application designed for the system 100, providing flexibility in how users interact with the platform. The web-based GUI ensures compatibility across different devices and operating systems, allowing users to access the platform without needing to install dedicated software. For those who prefer a more integrated experience, the software application provides additional functionality, such as real-time notifications, simplified data management, and enhanced security controls.

Figure 2:
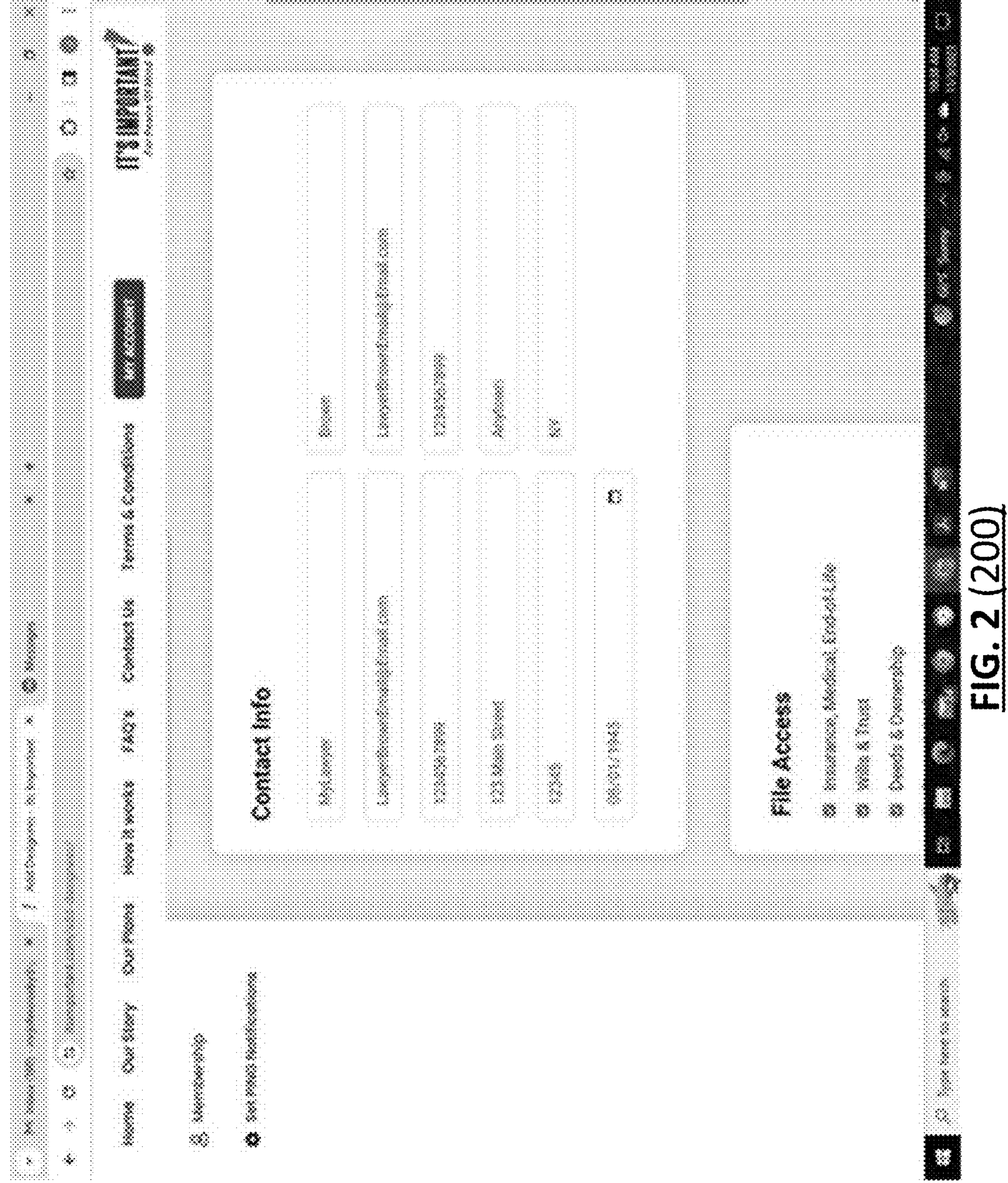
FIG. 2 illustrates an graphical user interface according to an example embodiment of the present disclosure.

FIG. 2 illustrates an example GUI screen 200 displayed on a screen of the user device 120. It shows displaying the designated individual management functionality. This GUI allows the user to add or edit designated individuals who are authorized to receive notifications and, in some cases, gain access to the user's important files under predefined conditions.

As can be seen in FIG. 2, a form labeled "Contact Info" is displayed where the user can input detailed information for each designee. This includes fields such as: (1) The designee's first and last name (e.g., "MyLawyer Brown"); (2) Email address for receiving alerts (e.g., "LawyerBrownEmail@Email.com"); (3) Phone number (e.g., "1234567899"); (4) Address, including street, city, and state details; (5) Date of birth, which could be relevant for legal or verification purposes. A person skilled in the art would understand that these fields are just merely example illustrations, and other similar fields can be displayed.

Beneath the contact information, the GUI screen 200 presents a section titled "File Access." This section provides checkboxes that allow the user to specify which categories of files the designee is permitted to access in case of an emergency or other triggering event. The categories can include: (1) Insurance, Medical, End-of-Life Documents; (2) Wills & Trust; (3) Deeds & Ownership Documents. A person skilled in the art would understand that these categories are just merely example illustrations, and other similar categories can be displayed.

Each category can be selected individually, giving the user full control over which documents are accessible by the designee. This granular control ensures that only the necessary information is shared with the right individuals, maintaining the user's privacy and data security. This interface serves as the primary tool for users to manage access permissions associated with the designated folders (e.g. folder A 162, folder B 164, folder C 166) in the storage 160.

Figure 3:
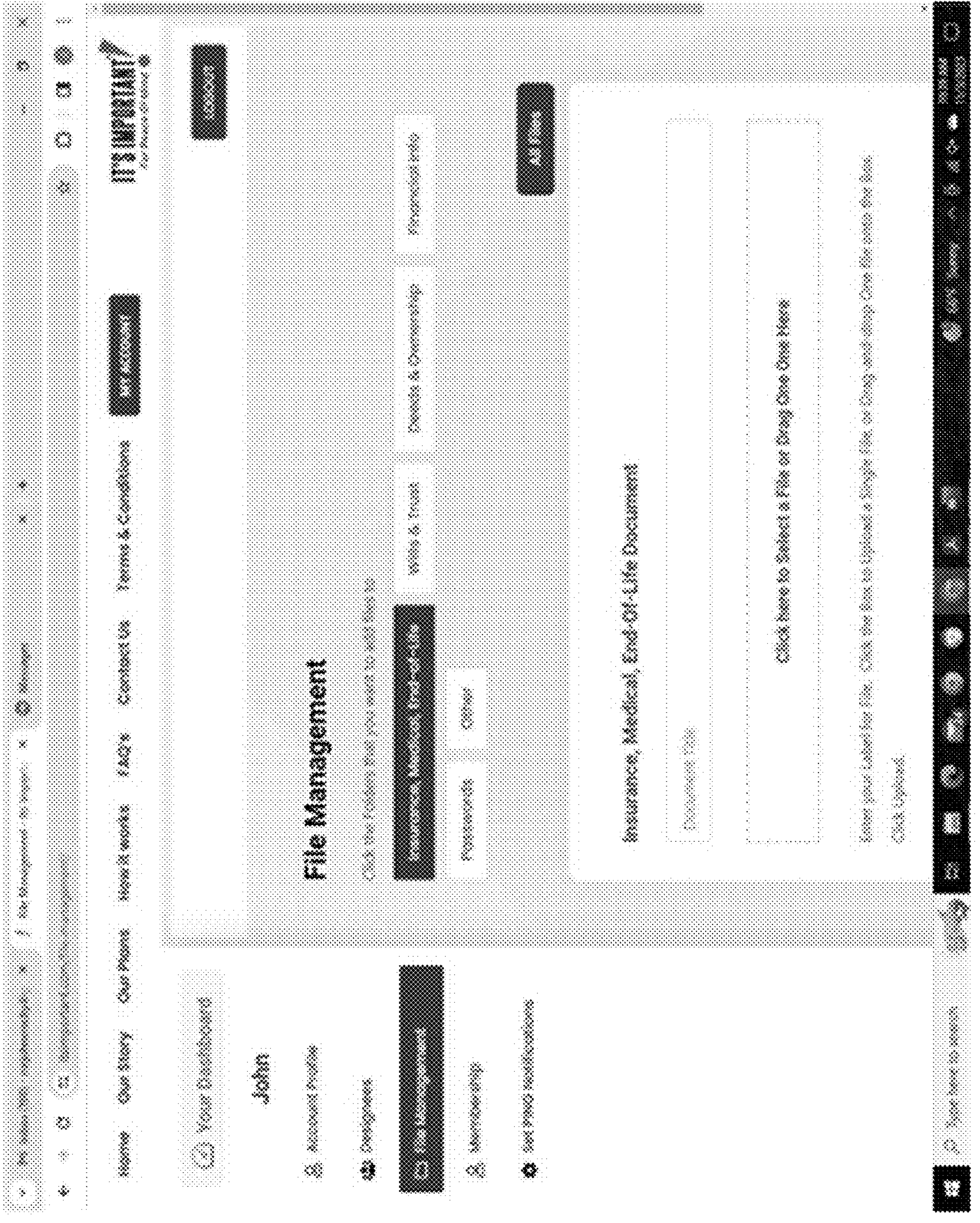
FIG. 3 illustrates an graphical user interface according to an example embodiment of the present disclosure.

FIG. 3 illustrates an example file management interface 300 of the system 100, which allows users to manage and upload documents related to various categories. The user is presented with a clear and organized dashboard for controlling their file storage, categorized by the type of document they are uploading. This interface 300 provides a streamlined method for securely managing sensitive information that can later be accessed by authorized designees.

In an example embodiment, shown on the left side is the user's dashboard menu, providing easy navigation to sections such as: (1) Account Profile: for managing user-specific information; (2) Designees: where the user can add or modify authorized individuals who can access specific files; (3) File Management: which is the active section being viewed in this figure; (4) Membership: likely to manage account plans; and (5) Set PING Notifications: to configure the system's life status checks.

As shown in the center of FIG. 3, is File Management—where the user is able to upload files to specific folders. In this example embodiment, the available folders can include: (1) Insurance, Medical, End-of-Life Documents; (2) Wills & Trust; (3) Deeds & Ownership; (4) Passwords; Financial Info; and (5) Other.

By clicking on any of these folders, the user can upload files relevant to the selected category. In this example, the folder for Insurance, Medical, End-of-Life documents has been selected. Beneath this, a user-friendly interface is provided for uploading documents. The user can input a Document Title, and either click to select a file or drag and drop a file directly into the designated upload box. This feature allows users to label and organize their documents efficiently, ensuring that all sensitive files are stored securely and are easily accessible when needed.

The upload box includes clear instructions, stating: "Enter your Label for File. Click the Box to Upload a Single File, or Drag-and-Drop One File onto the Box." Once the document is selected, the system 100 will securely store the file, making it available for future access by the user or authorized designated individuals.

This interface 300 serves as the hub for managing critical documents that are essential in case of an emergency or life event. It provides the user with complete control over which documents are uploaded, how they are categorized, and who will have access to them in predefined circumstances, such as incapacitation or death.

Figure 4:
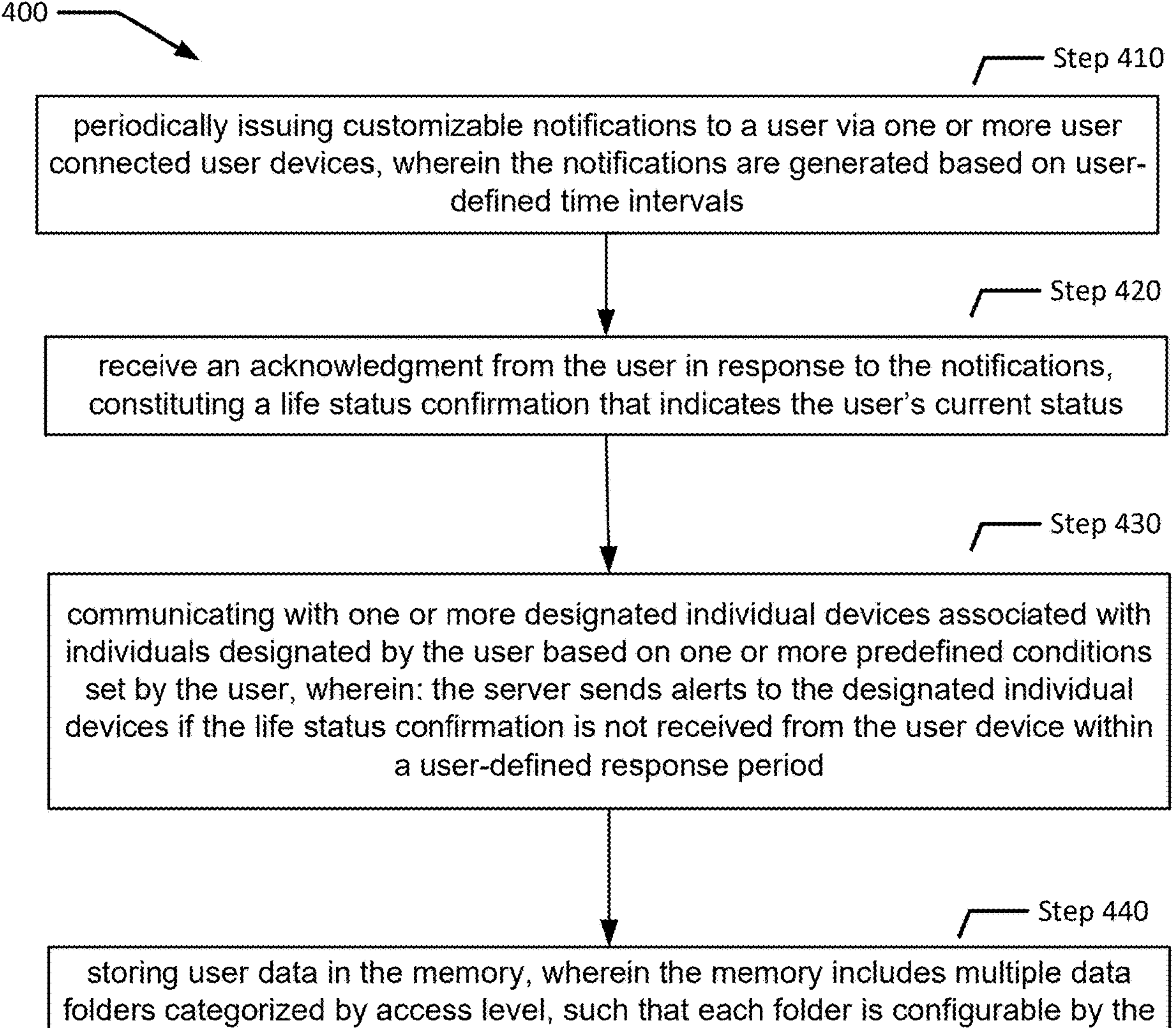
FIG. 4 shows a flowchart method according to an example embodiment of the present disclosure.

FIG. 4 illustrates a flowchart for a method 400 for managing the life status of the user. In an example embodiment, this method 400 is similar to the process described previously with respect to system 100. The method 400 includes a step 410, where the system initiates issuing periodic notifications to the user via one or more user devices. These notifications are sent at user-defined intervals. These aspects have been described previously with respect to system 100.

Once a notification is sent, the method proceeds to step 420, which involves receiving an acknowledgment from the user in response to the notifications, constituting a life status confirmation that indicates the user's current status. The confirmation serves as an indication of the user's current life status or well-being. These aspects have been described previously with respect to system 100.

Next, in step 430, the system communicates with designated individual devices that are associated with individuals selected by the user. These communications are based on predefined conditions set by the user. If the user does not respond within a user defined response period, the system 100 sends alerts to the designated individual devices. These alerts inform the designated individuals that no confirmation has been received from the user, and action may be required. These aspects have been described previously with respect to system 100.

In Step 440, the system stores user data in memory, where the memory includes multiple configurable data folders. Each folder can be customized by the user to allow access to designated individuals based on the conditions predefined by the user, ensuring that only authorized individuals can access specific folders. These aspects have described previously with respect to system 100.

Figure 5:
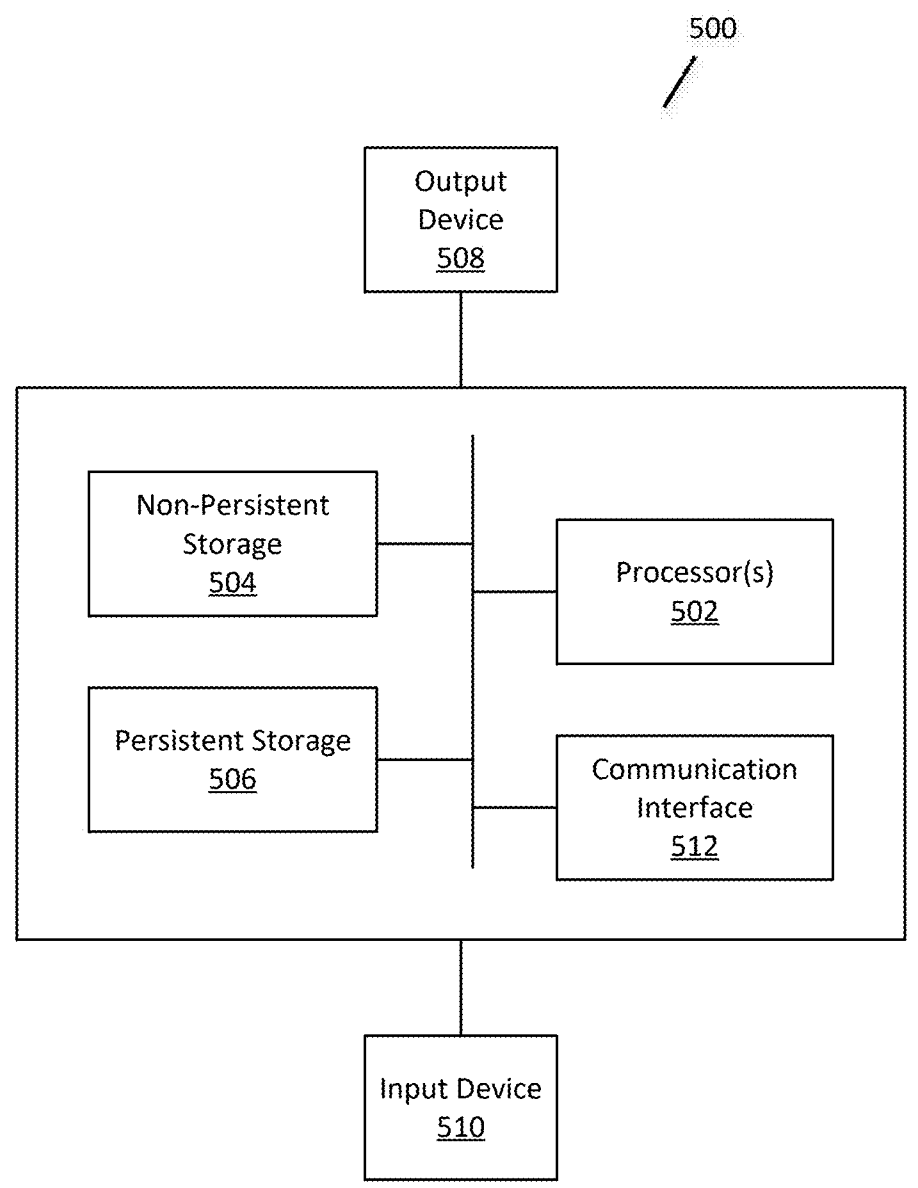
FIG. 5 illustrates a block diagram of a computing device according to an example embodiment of the present disclosure.

FIG. 5 illustrates a block diagram of a computing device, in accordance with one or more examples of this disclosure. As discussed above, examples described herein may be implemented, at least in part, using computing devices, and the computing device 500 shown in FIG. 5 may be such a computing device. For example, all or any portion of the components shown in FIG. 1 and/or FIG. 4 may be implemented, at least in part using a computing device such as the computing device 500, and may include all or any portion of the components of the computing device 500 shown in FIG. 5 and described below.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. In some examples, a computing device (e.g., the computing device 500) may include any number of heterogeneous processors.

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be a central processing unit (CPU), a multi-core CPU, an application specific integrated circuit (ASIC), a graphics processing unit (GPU), a data processing unit (DPU), a tensor processing units (TPU), an associative processing unit (APU), a vision processing units (VPU), a quantum processing unit (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not included in a drawing. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, a network device, or a processing device to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operative connection, and variations thereof, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

The invention claimed is:

1. A server system for managing life status verification, comprising:
- a processor and associated memory, the processor is configured to:
  - periodically issue customizable notifications to a user via one or more user connected user devices, wherein the notifications are generated based on user-defined time intervals;
  - receive an acknowledgment from the user in response to the notifications, constituting a life status confirmation that indicates the user's current status;
  - communicate with one or more designated individual devices associated with individuals designated by the user based on one or more predefined conditions set by the user, wherein the predefined conditions include a death of the user, wherein: the server sends alerts to the designated individual devices if the life status confirmation is not received from the user device within a user-defined response period;
  - the server provides a first level of access to medical and insurance records stored in a first data folder upon a report by a designated individual that the user is having a medical emergency, without requiring verification of official documents;
  - the server provides a second level of access to sensitive files stored in a second data folder only after a manual verification of a death certificate by an employee managing the system following a report of the death of the user:
  - store user data in the memory, wherein the memory includes multiple data folders categorized by access level, such that each folder is configurable by the user to control access rights of designated individuals under specific predefined conditions.

2. The system of claim 1, further comprising a verification mechanism configured to:
- validate the death of the user through manual verification of the death certificate by the employee managing the system; and
- grant access to the designated individuals to specified data folders upon successful validation of the user's condition and the predetermined conditions set by the user.

3. The system of claim 1, wherein the user can assign different levels of access to designated individuals, wherein a first level provides immediate release of healthcare directives and insurance policies upon a report of a medical emergency to facilitate timely care, and a second level requires a verified death certificate before releasing legal wills, trusts, and other sensitive documents associated with end-of-life scenarios.

4. The system of claim 1, further comprising a security framework configured to encrypt the user data stored in the memory, wherein the encryption techniques include Advanced Encryption Standard (AES) and/or Rivest-Shamir-Adleman (RSA) encryption algorithms, and wherein the server is configured to generate a unique public key to encrypt outbound notifications and data transmitted to the designated individual devices.

5. The system of claim 4, wherein the server is further configured to:
- encrypt communication between the server and the user devices using public key encryption;
- ensure that only authorized designated individuals can access the data folders through secure decryption methods.

6. The system of claim 1, wherein the multiple data folders are categorized by document types selected from one or more of the following: medical records, financial information, legal documents, wills, trusts, insurance policies, evidence of asset ownership, asset schedules, debt schedule, photographs, videos, personal messages, digital accounts and passwords, personal data, contacts or special instructions.

7. The system of claim 1, wherein the periodic notifications include one or more of:
- text messages, push notifications via a mobile application, and email notifications.

8. The system of claim 1, wherein the predefined conditions set by the user for granting access to designated individuals include the user's death or failure to respond to life status notifications within a pre-defined time period.

9. The system of claim 1, wherein the server is further configured to allow the designated individuals to report the condition of the user, including incapacitation, unavailability, or death, directly through an interface accessible on the designated individual devices.

10. The system of claim 1, wherein the server is configured to send escalating alerts to additional designated individuals if no response is received from the user.

11. A computer-implemented method for managing life status verification, comprising:
- periodically issuing customizable notifications to a user via one or more user connected user devices, wherein the notifications are generated based on user-defined time intervals;
- receiving an acknowledgment from the user in response to the notifications, constituting a life status confirmation that indicates the user's current status;

communicating with one or more designated individual devices associated with individuals designated by the user based on one or more predefined conditions set by the user, wherein the predefined conditions include a death of the user, wherein: the server sends alerts to the designated individual devices if the life status confirmation is not received from the user device within a user-defined response period;

providing a first level of access to medical and insurance records stored in a first data folder upon a report by a designated individual that the user is having a medical emergency, without requiring verification of official documents;

providing a second level of access to sensitive files stored in a second data folder only after a manual verification of a death certificate by an employee managing the system following a report of the death of the user;

storing user data in the memory, wherein the memory includes multiple data folders categorized by access level, such that each folder is configurable by the user to control access rights of designated individuals under specific predefined conditions.

12. The method of claim 11, further comprising:

validating the death of the user through manual verification of the death certificate by the employee managing the system; and granting access to the designated individuals to specified data folders upon successful validation of the user's condition and the predetermined conditions set by the user.

13. The method of claim 11, further comprising:

assigning different levels of access to designated individuals, wherein a first level provides immediate release of healthcare directives and insurance policies upon a report of a medical emergency to facilitate timely care, and a second level requires a verified death certificate before releasing legal wills, trusts, and other sensitive documents associated with end-of-life scenarios.

14. The method of claim 11, further comprising:

encrypting the user data stored in the memory using a security framework, wherein the encryption techniques include Advanced Encryption Standard (AES) and/or Rivest-Shamir-Adleman (RSA) encryption algorithms, and wherein the server generates a unique public key to encrypt outbound notifications and data transmitted to the designated individual devices.

15. The method of claim 14, further comprising:

encrypting communication between the server and the user devices using public key encryption; and ensuring that only authorized designated individuals can access the data folders through secure decryption methods.

16. The method of claim 11, further comprising:

categorizing the multiple data folders by document types selected from one or more of the following: medical records, financial information, legal documents, wills, trusts, insurance policies, evidence of asset ownership, asset schedules, debt schedule, photographs, videos, personal messages, digital accounts and passwords, personal data, contacts and special instructions.

17. The method of claim 11, wherein the periodic notifications include one or more of:

text messages, push notifications via a mobile application, and email notifications.

18. The method of claim 11, further comprising:

setting predefined conditions by the user for granting access to designated individuals, wherein the conditions include the user's death, or failure to respond to life status notifications within a pre-defined time period.

19. The method of claim 11, further comprising:

enabling the designated individuals to report the condition of the user, including incapacitation, unavailability, or death, directly through an interface accessible on the designated individual devices.

20. The method of claim 11, further comprising:

sending escalating alerts to additional designated individuals if no response is received from the user within the predefined response period.

* * * * *